United States Patent [19]

Tezuka et al.

[11] 4,319,821
[45] Mar. 16, 1982

[54] SHUTTER BLADES FOR CAMERA

[75] Inventors: Nobuo Tezuka, Tokyo; Michio Hirohata, Inagi, both of Japan

[73] Assignee: Canon Kabushiki Kaisha, Tokyo, Japan

[21] Appl. No.: 195,659

[22] Filed: Oct. 9, 1980

[30] Foreign Application Priority Data

Oct. 13, 1979 [JP] Japan .......................... 54-141640[U]
Oct. 13, 1979 [JP] Japan .......................... 54-141642[U]

[51] Int. Cl.$^3$ .......................... G03B 9/06; G03B 9/08; G03B 9/02
[52] U.S. Cl. ................................. 354/230; 354/234; 354/274
[58] Field of Search .............................. 354/270–274, 354/234, 235, 230

[56] References Cited

U.S. PATENT DOCUMENTS

| | | | |
|---|---|---|---|
| 3,421,427 | 1/1969 | Starp | 354/230 |
| 3,438,316 | 4/1969 | Rodier | 354/274 |
| 4,009,946 | 3/1977 | Geyer et al. | 354/274 X |
| 4,017,872 | 4/1977 | Iwata et al. | 354/234 X |
| 4,047,212 | 9/1977 | Yamada | 354/270 |

*Primary Examiner*—Donald A. Griffin
*Attorney, Agent, or Firm*—Toren, McGeady & Stanger

[57] ABSTRACT

A plurality of shutter blades for a camera serving at the same time as the diaphragm blades consisting of colored plastics, so designed that when the opening for the light beam is covered with the shutter blades more than two shutter blades are overlapped over each other so as to shade the light opening. Further at the object side in the operation space of the shutter blades a plastic control member having an opening almost the same as or larger than the light opening is provided as a heat insulation member for the shutter blades.

8 Claims, 6 Drawing Figures

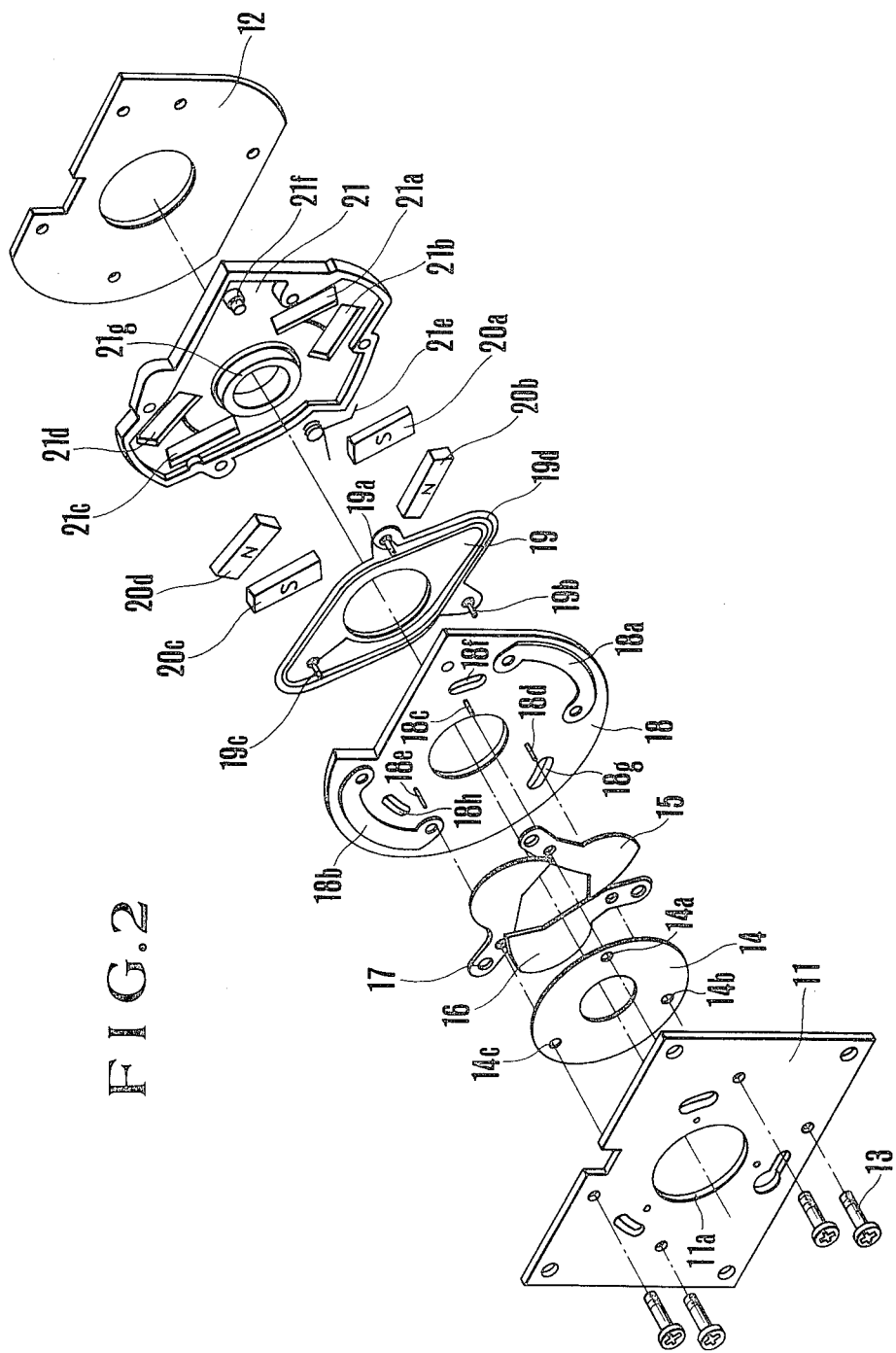
F I G. 2

F I G. 3
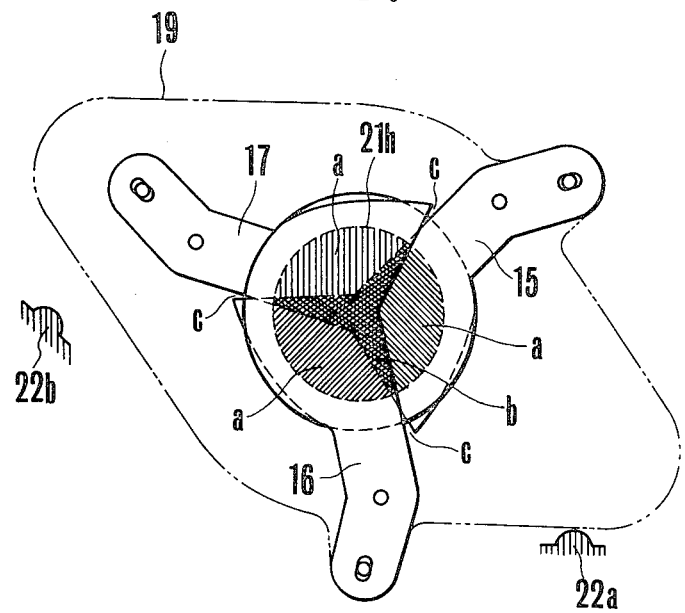
F I G. 4
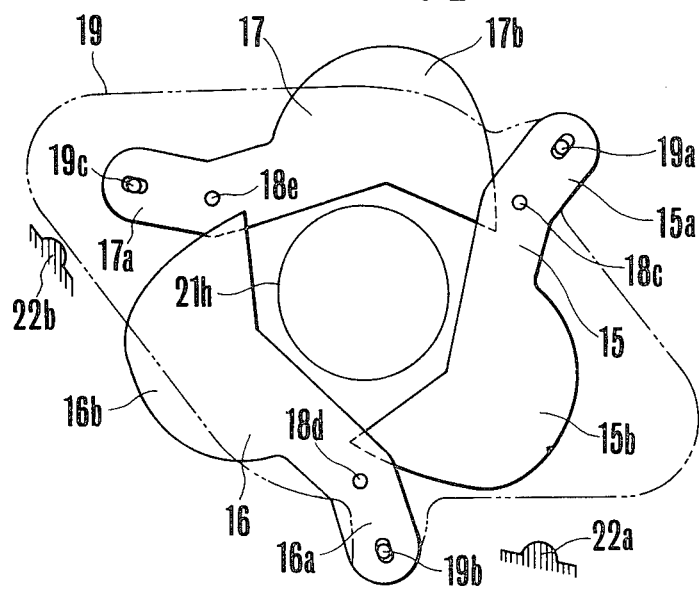

SHUTTER BLADES FOR CAMERA

BACKGROUND OF THE INVENTION

1. Field of the Invention

The present invention relates to a shutter blades assembly suitable for an electromagnetically driven shutter.

2. Description of the Prior Art

Generally speaking in case of the electromagnetically driven shutter the electromagnetically force is used as the driving force for the shutter blade, whereby the electromagnetic force is represented by $F=BIL$ and is proportional to the magnetic flux density B, the current I and the length of the coil L.

Consequently in order to drive the shutter blades with a large driving force it is necessary that at least one of the magnetic flux density, the current or the length of the coil should be large. However, the magnetic flux density obtainable from the magnetic material now in use is limited, while the current obtainable from the battery to be loaded in camera is also limited. Further, considering the fact that the coil is built in the camera, the length of the coil cannot be made so long, whereby especially in case of the moving coil type electromagnetically driven shutter the increase of the coil length means an increase of the moment of inertia of the coil itself, which does not always improve the motion characteristics of the moving coil.

Consequently, only a certain limited electromagnetic force can be utilized in order to drive the shutter blades.

On the other hand, the blade for the lens shutter consists of a thin metal plate, while the shutter consists of one, two or more blades, whereby the larger the number of shutter blades, the better the shape of the shutter opening but the more complicated the construction resulting in a larger moment of inertia. Consequently, most of the shutters comprise about five blades as is shown in FIG. 1. The shutter in FIG. 1 consists of five blades $1_1$, $1_2$, $1_3$, $1_4$ and $1_5$, so designed that there occurs a shutter blade overlap over the adjacent blades when the shutter is closed. The blades $1_1$, $1_2$, $1_3$, $1_4$ and $1_5$ open along with the rotation of the sector ring 2 in the counterclockwise direction, and they are closed when the sector ring 2 resumes the initial position.

When the shutter constructed as mentioned above is driven by means of the above-mentioned electromagnetic force, it is impossible to drive the shutter at a sufficient speed by means of a certain limited electromagnetic force because the moment of inertia of the shutter blades consisting of thin metal plates is large.

Thus a recent approach has involved replacement of the thin metal plates for the shutter blades with blades consisting of plastics such as polyester so as to reduce the moment of inertia of the movable parts. The specific weight of the plastic is generally 1/6-1/7 as large as that of metals thereby contributing to the reduction of the moment of inertia of the movable parts of the electromagnetically driven shutter.

Consequently, significant improvement in the motion characteristics of the shutter occurs by adoption of plastic shutter blades for the electromagnetically driven shutter.

However, when the plastic shutter blades are constructed of a thickness similar to that of the metal blades, it is impossible to obtain a sufficient light shading ability. The plastic material is naturally colored so as to provide a given a light shading ability, and if the plastic is too thin it permits the passage of some light. When for this reason thicker plastic shutter blades are provided, the moment of inertia of the moving part cannot be reduced, thus eliminating the advantages of plastic shutter blades whereby if thinner shutter blades are used, it is impossible to completely shade the light. Further, it is difficult to build large shutter blades in the camera.

Further, because the plastic shutter blades are arranged in direct contact with the metal plate for fixing the shutter on the camera, when the metal plate is warmed with the heat radiated from the sun, the shutter is also heated in such a manner that the metal plate and the shutter blades often adhere to each other, and the blades are easily deformed. Further, static electricity is produced between the shutter blades and the lacquered metal plate by means of the opening and closing operation of the shutter, which promotes adhesion until at last the shutter blades do not move.

SUMMARY OF THE INVENTION

An object of the present invention is to eliminate the above-mentioned shortcomings so as to guarantee the light shading ability when the shutter is closed, by designing the shutter in such a manner that when a plural number of the plastic shutter blades covers the opening for the light beam at least more than two shutter blades are overlapped on the opening.

Another object of the present invention is to prevent the heat conduction to the shutter blades, by providing a control member consisting of the same plastic material as that for the shutter blade and having an opening as large as or larger than the opening for the light beam at the object side in the operation space of the plastic shutter blades.

Further other objects will be obvious from the explanations to be made below in accordance with the embodiments.

BRIEF DESCRIPTION OF THE DRAWINGS

FIG. 2 shows an embodiment of the electromagnetically driven shutter in accordance with the present invention in disassembled view.

FIG. 3 shows in detail the shutter blades in FIG. 2 in the closed state.

FIG. 4 shows in detail the shutterr blades in FIG. 2 in the opened state.

DESCRIPTION OF THE PREFERRED EMBODIMENTS

Figure 1:
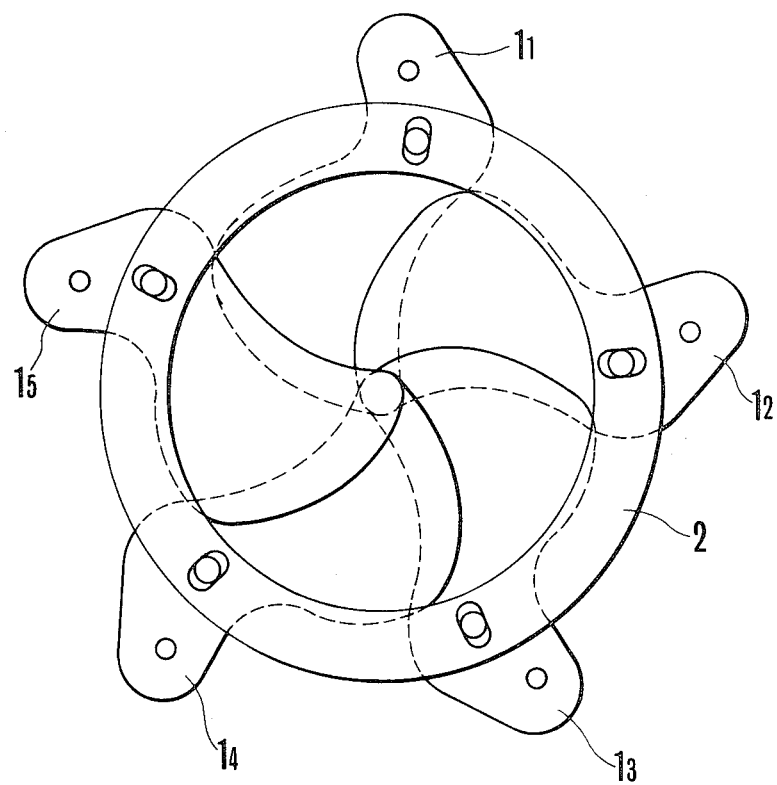
FIG. 1 shows the construction of the conventional shutter blades.

Below an embodiment of the present invention will be explained in accordance with the present invention.

FIG. 2 shows the important elements of the electromagnetically driven shutter in disassembled perspective view. In the drawing, 11 is the first base plate provided on the camera body and 12 is the second base plate consisting of magnetic material. The first and the second base plates 11 and 12 are assembled by means of screws 13, whereby between the first and the second base plates 11 and 12, there are arranged in sequence the shutter operation range control member 14, three plastic shutter blades 15, 16 and 17, the guide plate 18 consisting of magnetic material, the rotor 19, the permanent magnets 20a, 20b, 20c and 20d and the positioning member 21. The first base plate 11, the control member 14, the guide plate 18, the rotor 19, the positioning member 21 and the second base plate 12 are respectively provided with an opening so as to admit light, while the three shutter blades 15, 16 and 17 are provided so as to interrupt the light path. These shutter blades 15, 16 and 17 are arranged together with the control member 14 between the guide plate 18 and the first base plate 11, whereby the spacers 18a and 18b provided on the guide plate 18 form a space in which the shutter blades are movable. Further, along the opening of the guide plate 18 pins 18c, 18d and 18e are provided so as to serve as the rotation shafts for the shutter blades 15, 16 and 17, whereby the pins 18c, 18d and 18e penetrate the shutter blades 15, 16 and 17 and the control member 14 so as to be inserted into the holes in the first base plate. Further, the guide plate 18 is provided with the guide holes 18f, 18g and 18h in which the pins 19a, 19b and 19c are inserted, whereby the pins 19a, 19b and 19c on the rotor 19 serve as the driving shaft of the shutter blades 15, 16 and 17.

The opening 14d for the light beam in the shutter operation control member 14 is made larger than the aperture opening but can be as large as the latter. The control member 14 consists of the same plastic as that for the shutter blades 15, 16 and 17 and is colored black. At this time, the plastic material with superior heat resistance such as polyester is considered suitable. The diameter of the holes 14a, 14b and 14c in the control members 14 is chosen a littlee large than that of the pins 18c, 18d and 18e to provide some play therebetween. The rotor 19 is provided with a coil 19d. The positioning member 21 is provided with holes 21a, 21b, 21c and 21d for the permanent magnets 20a, 20b, 20c and 20d magnetized along the direction of the thickness of the plate as is shown in the drawing. The positioning member 21 is also provided with a spring hanger 21f for the spring 21e for urging the rotor 19 in the clockwise direction and with a support 21g for the rotor 19. When a current is supplied to the coil 19d of the rotor 19 in order to drive the shutter blades 15, 16 and 17, an electromagnetic force is produced in the coil 19d by means of the magnetic flux of the permanent magnet 20a, 20b, 20c and 20d in accordance with the Fleming's law so as to rotate the rotor against the strength of the spring 21e along the counterclockwise direction.

FIGS. 3 and 4 show the shutter blades 15, 16 and 17 shown in FIG. 2 respectively in the closed state and in the opened state. 18c, 18d and 18e are the pins of the guide plate 18, serving as the rotation shafts of the shutter blades 15, 16 and 17, while 19a, 19b and 19c are the pins provided on the rotor so as to serve as the driving shafts of the shutter blades 15, 16 and 17. The rotor 19 is shown by the two dot dash line, while 22a and 22b are the stoppers for limiting the rotation of the rotor 19. 21h is the opening for the light beam as the aperture opening of the positioning member 21. The shutter blades 15, 16 and 17 consist of thin plastic material such as polyester in order to reduce the moment of inertia. The plastic material constituting the shutter blades 15, 16 and 17 is colored for example black so as to block light. Thus, while the colored shutter blades 15, 16 and 17 consisting of plastic material are individually too thin to obtain a complete light shading ability, in order to obtain a complete light shading ability at least two of the three shutter blades 15, 16 and 17 are overlapped so as to cover the opening 21h when the shutter is closed. Thus, although the first shutter blade admits the passage of a little light, the light is completely shaded by means of the second shutter blade. The three shutter blades 15, 16 and 17 have the same shape, consisting of the arm portions 15a, 16a and 17a and of the light shading portions 15b, 16b and 17b. The light shading portions 15b, 16b and 17b are formed a little large than a semicircle in such a manner that the remaining portions are fan-shaped. Consequently, the shutter blades 15, 16 and 17, which are closed, cover the opening 21h by means of the two or three overlapped blades as is shown with the shaded portions a and b in FIG. 3. However, the end of each light shading portion 15b, 16b and 17b is not overlapped on the shutter blade adjacent at the right side when the shutter is closed, having a certain determined distance c from the arm portion. This distance is intended to avoid the collision of the shutter blades with each other, whereby the corresponding part is outside of the range of the opening 21h so that even if the shutter blades are not overlapped there occurs no problem with the light shading. Further, the end of each light shading portion 15b, 16b and 17b is always overlapped on the shutter blade at the left side when the shutter is opened, in order to obtain a smooth shutter closing operation. The shape of the opening of the shutter blades 15, 16 and 17 is hexagonal.

Figure 5:
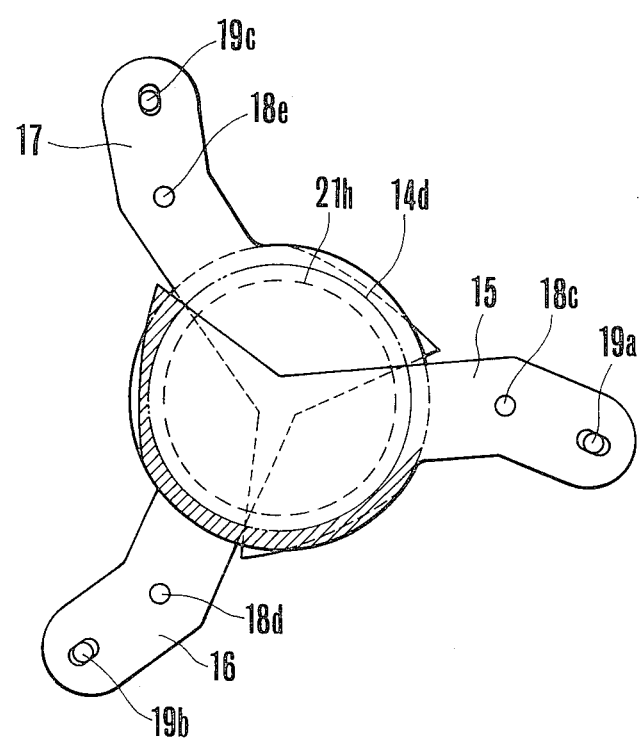
FIG. 5 shows in detail the relation between the shutter blades in FIG. 2 and the opening for the light beam.
Figure 6:
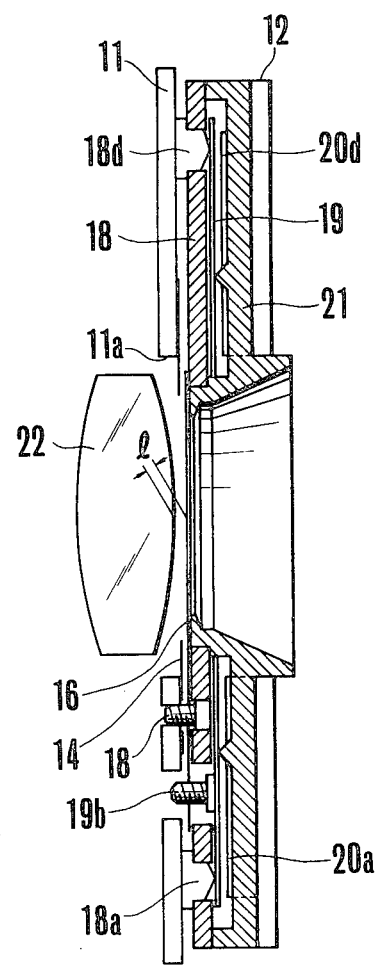
FIG. 6 shows the electromagnetically driven shutter in FIG. 2 in the assembled state in section.

FIG. 5 shows the relation between the shutter blades shown in FIG. 2 and the opening for the light beam in the closed state of the shutter. In the drawing, the dotted line shows the opening 21h of the positioning member 21 as the aperture opening. 18c, 18d and 18e are the pins provided on the guide plate 18 so as to serve as the rotation shafts for the above-mentioned shutter blades 15, 16 and 17, while 19a, 19b and 19c are the pins provided on the rotor 19 so as to serve as the driving shafts for the above-mentioned shutter blades 15, 16 and 17. In the drawing, the two dot dash line shows the opening 14d of the control means 14, whereby the shutter blades 15, 16 and 17 are necessarily sufficiently large for covering the opening 14d for the light beam when the shutter is closed. For example, in case of the shutter blade 15, it is necessary that the blade 15 should be larger than the opening 14d for the light beam by the part shown with shading lines. When the diameter of the circumference of the shutter blades 15, 16 and 17 is smaller than that of the opening 14d, there is the danger that the shutter blades might strike against the opening 14d when the shutter blades 15, 16 and 17 are opened. In order to avoid this, the diameter of the circumference of the shutter blades 15, 16 and 17 is chosen larger than that of the opening 14d.

In this way, the diameter of the opening 14d for the light beam in the first base plate 11 can be made larger than that of the lens 22 as is shown in FIG. 5, without being limited with the shape of the shutter blades 15, 16 and 17, so that the distance l between the lens 22 and the shutter blades 15, 16 and 17 can be made small, which increases the freedom for designing the lens.

Hereby, the shutter blades 15, 16 and 17 are normally closed as is shown in FIG. 3, whereby the opening 21h is covered by means of two or three shutter blades overlapped on each other so that the complete light shading can be obtained even by means of the very thin shutter blades 15, 16 and 17 consisting of plastic materials.

When a current is supplied to the coil 19d of the rotor 19 along the direction of the arrow, an electromagnetic force is produced in the coil 19d so as to rotate the rotor 19 against the strength of the spring 21e along the counterclockwise direction until the rotor 19 is stopped with the stopper 22b. The rotation of the rotor 19 is transmitted to the shutter blades 15, 16 and 17 through the pins 18c, 18d and 18e so as to bring the shutter blades 15, 16 and 17 in the opened state as is shown in FIG. 4 in such a manner that the exposure is possible. Because at this time the diameter of the circumference of the shutter blades 15, 16 and 17 is larger than that of the opening 14d for the light beam, the shutter blades 15, 16 and 17 make an opening operation, without striking against the opening 14d.

When after the lapse of a certain determined time current supply to the coil 19d of the rotor 19 is terminated and the electromagnetic force produced in the coil 19d disappears, the rotor 19 rotates by means of the spring 21e to the position of the stopper 22a along the clockwise direction. Along with the rotation of the rotor 19 the shutter blades 15, 16 and 17 start the closing operation. Because at this time the ends of the light shading portions 15b, 16b and 17b of the shutter blades 15, 16 and 17 start to move from the positions at which the ends are overlapped on the adjacent shutter blades, the shutter blades do not strike against each other during the operation. The shutter blades 15, 16 and 17 terminate the closing operation in the state shown in FIG. 3, whereby because the ends of the light shading portion 15b, 16b and 17b terminate the operation, having a distance c for the shutter blades adjacent at the right side, it is possible to avoid the collision of the shutter blade with each other at the termination of the shutter closing operation.

When heat such as may be radiated from the sun is produced from the object side, the temperature of the first plate 11 increases, whereby because between the shutter blades 15, 16 and 17 and the first base plate 11 the control member 14 is provided, the heat is absorbed in the control member so as not to be transmitted to the shutter blades 15, 16 and 17. Thus, the influence of the heat upon the shutter blades 15, 16 and 17 is reduced. Further, by constituting the control means 14 of the material for the shutter blades 15, 16 and 17, the static electricity accompanying the opening and the closing operation of the shutter blades is negligible so that extremely stabilized characteristics of the movement of the shutter blades 15, 16 and 17 can be obtained.

Further, because the pins 18c, 18d and 18e are engaged into the holes 14a, 14b and 14c with a proper play as explained above, even if the control member 14 expands or contracts due to the heat, the deformation of the control means 14 due to the heat is absorbed so that the influence upon the shutter blades are very little.

It has been found that three is the most suitable number of shutter blade for the time of mechanism herein involved.

In the case of an electromagnetically driven shutter the moment of inertia of the movable parts can not be too large, so that provision of too many shutter blades is not suitable. On the other hand the driving stroke cannot be made large so that utilization of only one or two shutter blades is not suitable. In order to realize the advantage of the present invention it is sufficient that the number of the shutter blades be more than two and although as in the case of one shutter blade a long stroke is needed to drive two shutter blades, problems arising with only one blade are avoided. When on the other hand the number of the shutter blades is more than four the construction is complicated in such a manner that the moment of inertia of the movable parts is increased so as to lower the efficiency of the movable parts. Consequently, it can be said that the most suitable number of the shutter blades is three.

The shutter blades in accordance with the present invention may be the shutter blades serving at the same time as the diaphragm blades.

As explained so far in detail in accordance with the present invention, when the opening for the light beam is covered by means of a plural number of plastic shutter blades, the opening is covered with at least more than two shutter blades overlapped over each other, so that the complete light shading can be obtained even with very thin colored plastic shutter blades.

Namely, a better light shading can be obtained with two thin shutter blades than with one thick shutter blade, whereby a further better light shading can be obtained with the plastics colored on the surface than with the plastics with mixed pigment. Further, by constituting the shutter with three shutter blades the optinum shutter characteristics for the electromagnetically driven shutter can be obtained. Further, each of the shutter blades is shaped and arranged, the relative position to the adjacent shutter blades having been taken into consideration, so that collision of the shutter blades against each other can be prevented. Further, because at the object side in the operation space of the plastic shutter blades a plastic shutter opening operation range control member having an opening almost same as or larger than that for the aperture is provided, the influence of temperature from the metal plate forming a part of the casing of the shutter device can be eliminated, while static electricity produced in connection of the shutter opening and closing operation can be prevented, which improves the movement characteristics of the shutter, whereby the diameter of the opening for the light beam on the above metal plate is not limited, so that the distance between the lens and the shutter blades can be made short, whereby the thickness of the shutter device along the direction of the optical axis can be made small, which increases the freedom of the lens construction.

What is claimed is:

1. A shutter for a camera comprising:
   a member having an opening for light beam;
   a plural number of shutter blades for opening and closing the opening for light beam, said shutter blades consisting of colored plastics and being shaped in such a manner that at least more than two shutter blades are overlapped so as to shade the opening for the light beam from the light when the opening is covered with the shutter blades; and
   a plastic control member having an opening almost as large as or larger than the opening for the light beam at the object side in the operation space of the shutter blade, said member serving as the heat insulating material for the shutter blades.

2. A shutter for a camera, comprising:
   a member defining an opening for passage of light therethrough;
   a plurality of shutter blades for opening and closing said opening, said plurality of shutter blades being formed of colored plastic material;

a shutter driving rotor for driving said plurality of shutter blades for opening and closing said opening; and means for having two or more of said shutter blades overlapped at any part of said opening when said opening is covered with a plurality of shutter blades by said rotor.

3. A shutter in accordance with claim 2, wherein said shutter blades serve simultaneously as the diaphragm blades for said camera.

4. A shutter in accordance with claim 2, wherein the number of said shutter blades is three.

5. A shutter in accordance with claim 4, wherein the opening formed with the three shutter blades is hexagonal.

6. A shutter in accordance with claim 5, wherein each of the three shutter blades consists of a light shading part whose opening side is cut in fan-shape and an arm part.

7. A shutter in accordance with claim 6, wherein only the end of each light shading part is not overlapped over the arm of the adjacent shutter blade when the shutter is closed.

8. A shutter according to claim 2 wherein said means for having said shutter blades overlapped has a stopper to block operation of said rotor at a certain position, and wherein said certain position is so selected that said plurality of shutter blades cover said opening in such a manner that two or more shutter blades are overlapped at any part of the opening.

* * * * *